UNITED STATES PATENT OFFICE.

CHARLES B. HALEY, OF OKLAHOMA, OKLAHOMA.

MINERAL-OIL EMULSION.

1,384,460.     Specification of Letters Patent.     Patented July 12, 1921.

No Drawing.     Application filed December 11, 1920. Serial No. 430,051.

*To all whom it may concern:*

Be it known that I, CHARLES B. HALEY, a citizen of the United States, residing at Oklahoma city, in the county of Oklahoma and State of Oklahoma, have invented a new and useful Improvement in Mineral-Oil Emulsions, of which the following is a specification.

The present invention relates to emulsions of mineral oils, and more particularly to emulsions of highly refined mineral oils for internal use.

I have discovered that mineral oils, and more particularly the highly refined mineral oils now in common use for internal administration as lubricants may be emulsified with milk of magnesia or magnesium hydrate (U. S. P.) by intimate admixture therewith, for example, by shaking, grinding or trituration or homogenization and without using emulsifying agents as are ordinarily used in forming emulsions of oils in aqueous vehicles.

The oil and the milk of magnesia may be present in varying proportions; for example, emulsions containing ⅓ oil by volume and upward have been made. An emulsion containing 50% oil by volume has been found most satisfactory for internal use.

The emulsion may be readily formed by shaking; however, when so formed, the oil is in a somewhat coarse state of dispersion. It is preferred that the emulsion be formed by grinding or trituration, for example, in a paint mill, although homogenization may likewise be employed. The emulsion thus formed contains the oil in a fine state of dispersion.

Emulsions formed in accordance with the present invention are cream-like in appearance and taste, are palatable, and are effective in internal use as a remedy and preventive for constipation. The mineral oil employed is preferably one which has been highly refined for internal use, for example, by means of fuming sulfuric acid, such oil being obtainable under various names, for example, "White oil," "Stanolax," "Nujol," "Albolene," etc. Although milk of magnesia or magnesium hydrate U. S. P. has been described hereinbefore as the emulsion vehicle, it is intended that any equivalent substance or suspension capable of emulsifying mineral oil is included where the term "milk of magnesia" is used herein.

I claim:

1. As an article of manufacture, an emulsion of mineral oil in milk of magnesia.

2. As an article of manufacture, an emulsion of mineral oil in an equal volume of milk of magnesia.

CHARLES B. HALEY.